US009105881B2

(12) United States Patent
Masuda

(10) Patent No.: US 9,105,881 B2
(45) Date of Patent: Aug. 11, 2015

(54) ENERGY STORAGE ELEMENT

(71) Applicant: GS Yuasa International Ltd., Kyoto-shi, Kyoto (JP)

(72) Inventor: Hideki Masuda, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 161 days.

(21) Appl. No.: 13/688,088

(22) Filed: Nov. 28, 2012

(65) Prior Publication Data

US 2013/0136977 A1 May 30, 2013

(30) Foreign Application Priority Data

Nov. 29, 2011 (JP) ................. 2011-261068
Nov. 9, 2012 (JP) ................. 2012-247803

(51) Int. Cl.
| H01M 2/26 | (2006.01) |
| H01M 2/02 | (2006.01) |
| H01M 2/06 | (2006.01) |
| H01M 2/30 | (2006.01) |
| H01M 10/0525 | (2010.01) |

(52) U.S. Cl.
CPC ............. *H01M 2/0202* (2013.01); *H01M 2/06* (2013.01); *H01M 2/26* (2013.01); *H01M 2/30* (2013.01); *H01M 2/263* (2013.01); *H01M 10/0525* (2013.01)

(58) Field of Classification Search
CPC ............ H01M 2/0217; H01M 2/0473; H01M 2/0469; H01M 2/06; H01M 2/263; H01M 2/305; H01M 2/469; H01M 2/473
See application file for complete search history.

(56) References Cited

U.S. PATENT DOCUMENTS

| 2009/0263711 | A1* | 10/2009 | Kim et al. ...................... 429/164 |
| 2010/0233528 | A1* | 9/2010 | Kim et al. ...................... 429/178 |
| 2010/0233529 | A1* | 9/2010 | Nansaka et al. ............... 429/181 |
| 2011/0287311 | A1* | 11/2011 | Kim et al. ...................... 429/181 |
| 2012/0021277 | A1* | 1/2012 | Byun et al. ..................... 429/178 |
| 2012/0064380 | A1* | 3/2012 | Kim et al. ........................ 429/66 |
| 2012/0088138 | A1* | 4/2012 | Munenaga et al. ............. 429/94 |
| 2012/0148909 | A1 | 6/2012 | Ito et al. |
| 2012/0148911 | A1* | 6/2012 | Suzuki et al. ................. 429/179 |
| 2012/0189884 | A1* | 7/2012 | Guen ............................... 429/82 |
| 2012/0196178 | A1 | 8/2012 | Kambayashi et al. |
| 2012/0196179 | A1 | 8/2012 | Suzuki et al. |

(Continued)

FOREIGN PATENT DOCUMENTS

| JP | 2001-307954 A | 11/2001 |
| JP | 2011-081950 A | 4/2011 |
| WO | WO 2010147136 A1 * | 12/2010 |

*Primary Examiner* — Ula C Ruddock
*Assistant Examiner* — Scott J Chmielecki
(74) *Attorney, Agent, or Firm* — McGinn IP Law Group, PLLC

(57) ABSTRACT

A non-aqueous electrolyte secondary battery including: a container; an electrode assembly housed in the container; an electrode terminal provided at the container; and a current collector which electrically connects the electrode terminal and the electrode assembly, wherein the container includes a wall having (i) an outer surface with a protrusion part formed to be protrude outward and (ii) an inner surface with a recess part formed corresponding in position to the protrusion part when the protrusion parts is formed, and the current collector includes a base part connected to the electrode terminal in the recess part and an arm part which extends from the base part in the direction opposite to the protrusion direction of the protrusion part, and is connected to the electrode assembly.

19 Claims, 10 Drawing Sheets

(56) References Cited

U.S. PATENT DOCUMENTS

2012/0237817 A1* 9/2012 Kim .............................. 429/158
2012/0264007 A1* 10/2012 Sasaki et al. ................. 429/182
2012/0276442 A1* 11/2012 Kim et al. .................... 429/179
2013/0004833 A1* 1/2013 Kim .............................. 429/181
2013/0171511 A1* 7/2013 Masuda ........................ 429/181

* cited by examiner

FIG. 5A
FIG. 5B
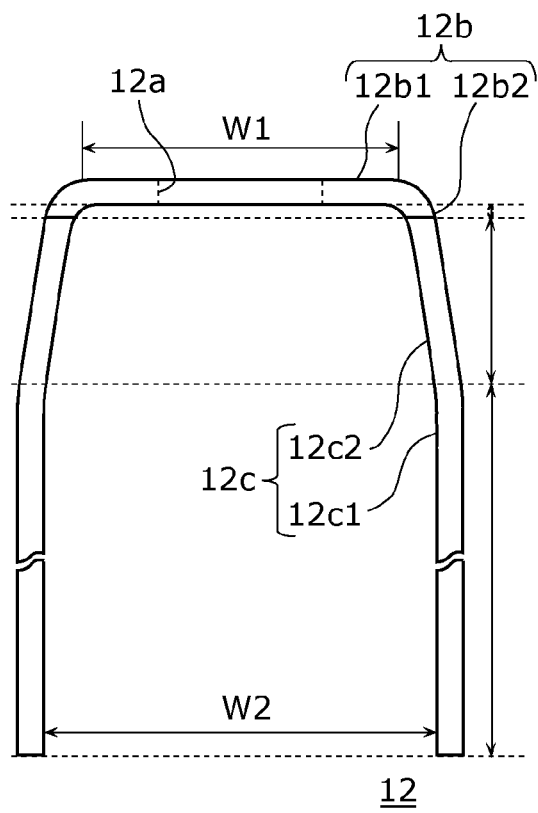
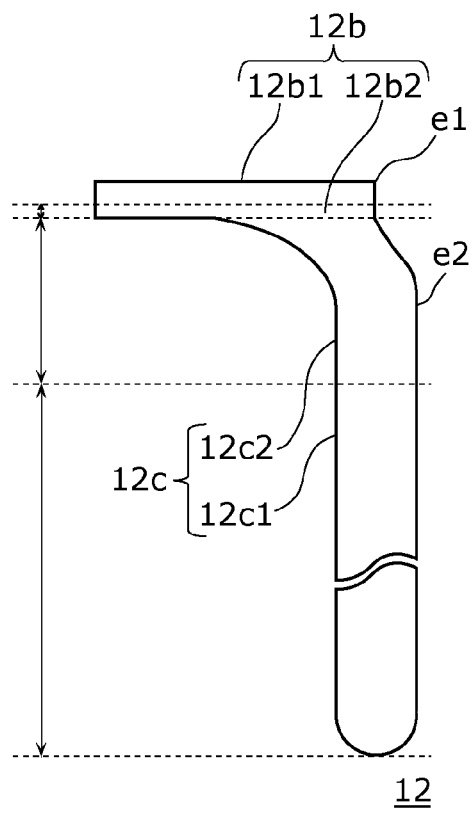
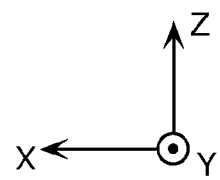
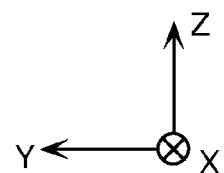

ENERGY STORAGE ELEMENT

CROSS REFERENCE TO RELATED APPLICATIONS

The present application is based on and claims priority of Japanese Patent Application No. 2011-261068 filed on Nov. 29, 2011 and Japanese Patent Application No. 2012-247803 filed on Nov. 9, 2012. THE entire disclosure of the above-identified application, including the specification, drawings and claims is incorporated herein by reference in its entirety.

FIELD

The present invention relates to an energy storage element such as a secondary battery and another battery.

BACKGROUND

Secondary batteries are used as replacements for primary batteries, and have been wide spread as power sources for electric appliances such as mobile phones and information technology (IT) devices. In particular, non-aqueous electrolyte secondary batteries represented by lithium ion batteries have high energy density and are increasingly applied to large industrial electric apparatuses such as electric vehicles.

Such a conventional non-aqueous electrolyte secondary battery includes current collectors, an electrode assembly, and internal insulation sealing members for insulating the current collectors and the cap part of a container as members arranged inside the container body among main structural elements (for example, see Patent Literature below).

CITATION LIST

Patent Literature

Japanese Unexamined Patent Application Publication No.

SUMMARY

Technical Problem

The present invention has been made in view of the aforementioned problems with an aim to provide an energy storage element which easily increases the housing efficiency of an electrode assembly with respect to the capacity of a container.

Solution to Problem

In order to achieve the aforementioned aim, an energy storage element according to an aspect of the present invention is an energy storage element including: a container; an electrode assembly housed in the container; an electrode terminal provided at the container; and a current collector which electrically connects the electrode terminal and the electrode assembly, wherein the container includes a wall having an outer surface and an inner surface, the outer surface having a protrusion part formed to protrude outward from the outer surface, and the inner surface having a recess part formed at a position corresponding to a position of the protrusion part, and the current collector includes: a base part connected to the electrode terminal in the recess part; and an arm part which extends from the base part in a direction opposite to a protrusion direction of the protrusion part, and is connected to the electrode assembly.

According to this, the container includes the wall having the outer surface with the protrusion part and the inner surface with the recess part. The recess part is formed at the position corresponding to the position of the protrusion part. The current collector electrically connected to the electrode terminal insides the container includes the base part connected to the electrode terminal inside the recess part. In addition, the current collector includes the arm part which extends from the base part housed in the recess part in the direction opposite to the protrusion direction of the protrusion part, and is connected to the electrode assembly.

In this way, the base part which is an element of the current collector connected to the electrode terminal is housed in the recess part formed on the cap part of the container. Thus, it is possible to match the space other than the space occupied by the recess part in the inner space of the container to the shape of the electrode assembly. In this way, it is possible to reduce wasteful space produced when the electrode assembly is housed inside the container only by adjusting the outer size of the electrode assembly to the size of the inner space. In this way, the shape of the container is adjusted to the shape of the electrode assembly without changing the structure of the electrode assembly. Therefore, it is possible to easily increase the housing efficiency of the electrode assembly with respect to the inner space (capacity) of the container.

In addition, the recess part may have a bottom surface, and a side surface continuously formed between the bottom surface and the inner surface of the wall of the container, the base part may include: a plate-shaped plate part formed along the bottom surface; and paired first wall parts formed continuously from opposing sides of the plate part such that the paired first wall parts faces the side surface of the recess part, the paired first wall parts may be tilted so as to be farther apart from each other at positions more distant from the plate part, and the arm part may be continuous from at least portions of the paired first wall parts and extend from the base part in a direction opposite to the protrusion direction of the protrusion part.

According to this, the current collector is configured to have the base part with the paired first wall parts which are tilted so as to be farther apart from each other at positions more distant from the plate part of the base part. The current collector has the arm part which is continuous from at least the portions of the paired first wall parts and which extends from the base part toward the side opposite to the protrusion direction of the protrusion part. For example, the arm part may be paired arm parts which extend toward the electrode assembly in a state where the arm parts continuous from the paired first wall parts of the base part are apart from each other more than the width of the plate part of the based part (the arm parts are in the proximity of the boundaries between the respectively corresponding paired first wall parts).

For this reason, for example, when the energy storage element is configured to have such a current corrector having the paired arm parts for sandwiching the electrode assembly, it is possible to secure wide spacing between the paired arm parts. In this way, it is possible to increase the size of the electrode assembly sandwiched by the paired arm parts. In other words, it is possible to increase the volume of the electrode assembly to be housed inside the container, and thereby further increase the housing efficiency of the electrode assembly with respect to the capacity of the container.

In addition, the recess part may have the side surface with paired side surface portions facing the paired first wall parts of the base part, the paired side surface portions being tilted so as to be farther apart from each other at positions more distant from the bottom surface of the recess part.

In this way, as in the case of the paired first wall parts, the recess part has the side surface with paired side surface portions which face the paired first wall parts of the base part of the current collector and which are tilted so as to be farther apart from each other at positions more distant from the bottom surface of the recess part. In other words, it is possible to bond the recess part and the base part of the current collector more strongly by configuring the recess part having side surfaces which face the paired first wall parts of the base part of the current collector and are tilted suitably for the tilted paired first wall parts. In addition, it is possible to secure a wide space for housing a bonding tool used to bond the electrode terminal and the base part of the current collector. Thus, it is possible to increase the operability in the manufacturing.

In addition, the container may have an outer shape of an approximately rectangular cuboid, and have a first surface which is rectangular and a second surface orthogonal to the first surface at an end portion in a longitudinal direction of the first surface, and the protrusion part may be formed at a position on the first surface apart from the second surface.

According to this, the container has the outer shape of an approximately rectangular cuboid. The protrusion part is formed at the position on the first surface which is included in the outer surface of the wall of the container and which is apart from the second surface orthogonal to the first surface. Accordingly, the protrusion part is not formed at least at the end portion of the cap part at the side of the first surface in the longitudinal direction of the container.

In addition, for example, assuming that the first surface is the upper surface of the cap part of the container, the following case is considered where the cap part having the first (upper) surface is bonded by, for example, welding with the container body. In this case, it is assumed here that no protrusion part is formed at both the edge portions in the longitudinal and lateral directions of the first surface which is of the cap part and on which the bonding is performed when the cap part is bonded with the container body. In short, no protrusion part is formed at the entire edge part of the first surface at the time of the bonding. For this reason, the edge portion of the cap part is used as space for housing a heat sink for releasing welding heat to the outside of the energy storage element. Since the space is secured for the heat sink for releasing welding heat in this way, it is easy to dispose the heat sink at the site at which the cap part is welded, and thus it is possible to manufacture the energy storage element without decreasing the performance of the energy storage element.

In addition, the arm part may include an arm body connected to the electrode assembly and a bridge part connecting the arm body and the first wall part, and the bridge part may be bent or curved along an inner shape of the recess part. According to this, the bridge part of the arm part of the current collector is bent or curved along the inner shape of the recess part. Thus, it is possible to approximate the shape of the arm part of the current collector to the outer shape of the electrode assembly. For this reason, it is possible to further increase the housing efficiency of the electrode assembly with respect to the capacity of the container.

In addition, in the longitudinal direction of the container, the arm part of the current collector may be connected to the electrode assembly at a position closer to the second surface of the container than to a position of the protrusion part inside the container, and the bridge part may connect the arm body and the paired first wall parts of the base part by being curved from the recess part toward the second surface of the container.

In addition, in the longitudinal direction of the container, an edge which is of the arm part and at the side of the second surface of the container may be positioned closer to the second surface than an edge which is of the base part and at the side of the second surface.

Here, for example, assuming that the first surface is the upper surface of the cap part as mentioned above, the following case is considered where the protrusion part is formed at an appropriate position on the cap part of the container with consideration of the space for housing the heat sink to be used when the cap part is welded. The bridge part of the arm part of the current collector is curved starting at the position at which the protrusion part is formed toward the side of the second surface which is the short side surface of the container. For this reason, even in the above case, the arm part of the current collector is connected to the electrode assembly at the side closer to the second surface. In this case, it is possible to make the electrode assembly closer, as much as possible, to the second surface orthogonal to the first surface (the upper surface of the cap part) at the end portion in the longitudinal direction of the first surface. In this way, it is possible to allow the electrode assembly to occupy not only the space closer to the first surface but also the space closer to the second surface in the inner space of the container. Thus, it is possible to further increase the housing efficiency of the electrode assembly with respect to the capacity of the container.

In addition, the current collector may have a plurality of the arm part, the plurality of the arm part being paired arm parts respectively continuous from the paired first wall parts, and the paired arm parts may sandwich the electrode assembly. For this reason, it is possible to connect the electrode assembly and the arm parts of the current collector more strongly.

In addition, the electrode storage element may further include an insulation member disposed between the bottom surface and the base part of the current collector, wherein the insulation member and the base part may be housed in a space which is defined by (i) the inner surface of the wall and (ii) the bottom surface of the recess part. In this way, (i) the insulation member for insulating the container and the current collector and (ii) the base part of the current collector are housed inside the recess part of the container. For this reason, it is possible to approximate the inner shape of the container and the outer shape of the electrode assembly. In other words, it is possible to make the electrode assembly closer to the first surface of the container as much as possible when housing the electrode assembly in the container. For this reason, it is possible to increase the housing efficiency of the electrode assembly with respect to the capacity of the container even when the energy storage element is configured to include the insulation member inside the container.

In addition, the insulation member may face the side surface of the recess part and include second wall parts enclosing the paired first wall parts of the base part.

In other words, the insulation member has the second wall part positioned between the side surfaces of the recess part formed in the cap part of the container and the first wall parts of the base part of the current collector. For this reason, the insulation member can reliably insulate the container and the current collector. In addition, for example, it is possible to reliably contact-bond the container and the insulation member by providing the insulation member having the second wall parts along the side surfaces of the recess part. Thus, it is possible to increase the air-tightness of the container.

In addition, the recess part may include a through-hole through which the electrode terminal penetrates, the electrode terminal may include: a plate-shaped terminal body disposed at a position corresponding to the recess part and outside the container, a column-shaped connection part which penetrates through the through-hole of the recess part, and a pressure-bonding end part which is electrically connected to the current collector by sandwiching and pressure-bonding, in the recess part, the container and the current collector together with the terminal body, wherein the base part, the pressure-bonding end part, and the insulation member may be housed in the space which is defined by (i) the inner surface of the wall and (ii) the bottom surface of the recess part.

In this way, the connection part which is of the electrode terminal and is for connection to the current collector is housed in the recess part of the container, in addition to the insulation member and the base part of the current collector. For this reason, it is possible to approximate the inner shape of the container and the outer shape of the electrode assembly. In other words, it is possible to make the electrode assembly closer to the first surface of the container as much as possible when the electrode assembly is housed in the container. For this reason, it is possible to increase the housing efficiency of the electrode assembly with respect to the capacity of the container even when the energy storage element is configured to include the insulation member inside the container.

In addition, the current collector may have a plurality of the arm part, the plurality of the arm part being paired arm parts respectively continuous from the paired first wall parts with spacing larger than a width of the base part in a direction in which the paired arm parts are arranged.

For this reason, for example, it is possible to secure wide spacing between the paired arm parts which sandwich the electrode assembly, and thereby it is possible to secure wide space for housing the electrode assembly sandwiched by the paired arm parts. In other words, it is possible to increase the volume of the electrode assembly to be housed inside the container, and thereby further increase the housing efficiency of the electrode assembly with respect to the capacity of the container.

It is to be noted that the wall of the container may be a cap part, and the protrusion part may be formed in the cap part of the container.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5A is a view of the current collectors in the Y-axis direction.

FIG. 5B is a view of one of the current collectors in the X-axis direction.

DESCRIPTION OF EMBODIMENT

The non-aqueous electrolyte secondary battery according to a conventional technique has the aforementioned structure. The conventional technique has problems as described below.

Figure 9:
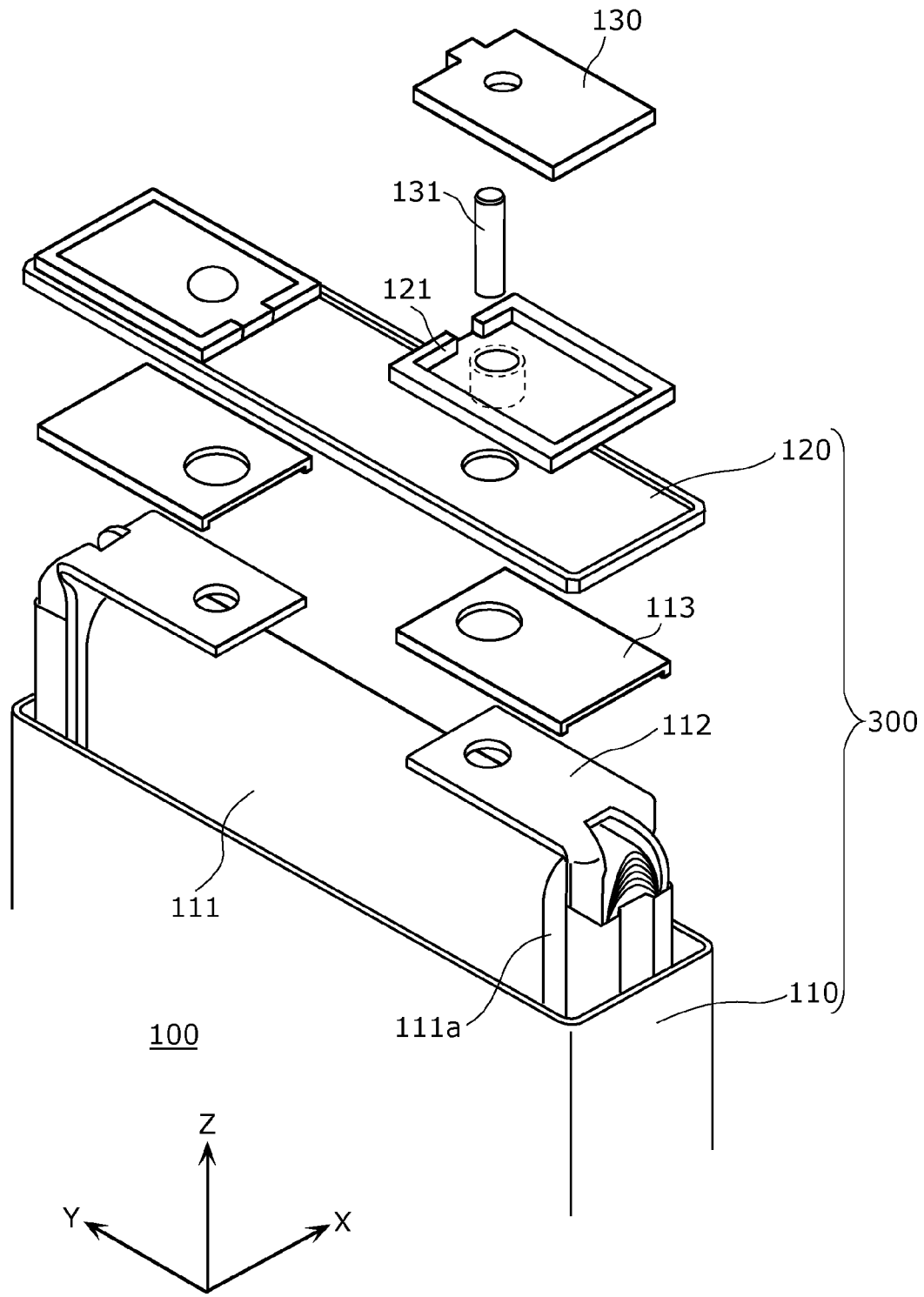
FIG. 9 is a schematic exploded perspective view of a non-aqueous electrolyte secondary battery according to a conventional technique.

More specifically, as shown in FIG. 9, the non-aqueous electrolyte secondary battery 100 according to the conventional Patent Literature includes: an electrode terminal 130, a container 300 including a cap part 120 and a container body 110, a current collector 112, an electrode assembly 111, an external insulation sealing member 121 for insulating the electrode terminal 130 and the container 300, and an internal insulation sealing member 113 for insulating the current collector 112 and the container 300. Among the structural elements of the non-aqueous electrolyte secondary battery 100, the internal insulation sealing member 113, the current collector 112, and the electrode assembly 111 are mainly housed inside the container 300. In order to electrically connect the electrode terminal 130 disposed outside the cap part 120 and the current collector 112, a structural element for bonding the electrode terminal 130 and the current collector 112 is required inside the cap part 120 of the container 300. In other words, especially at the back side of the electrode terminal 130 in the inner space of the container 300, such a member other than the electrode assembly 111 occupies some area of the inner space.

If it is possible to increase the volume rate (hereinafter referred to as "housing efficiency") of the electrode assembly 111 in the inner space of the container 300 of a non-aqueous secondary battery, it is possible to easily increase the battery capacity without increasing the volume of the non-aqueous secondary battery. For this reason, it is necessary to efficiently house the electrode assembly 111 in the inner space of the container 300.

Figure 10:
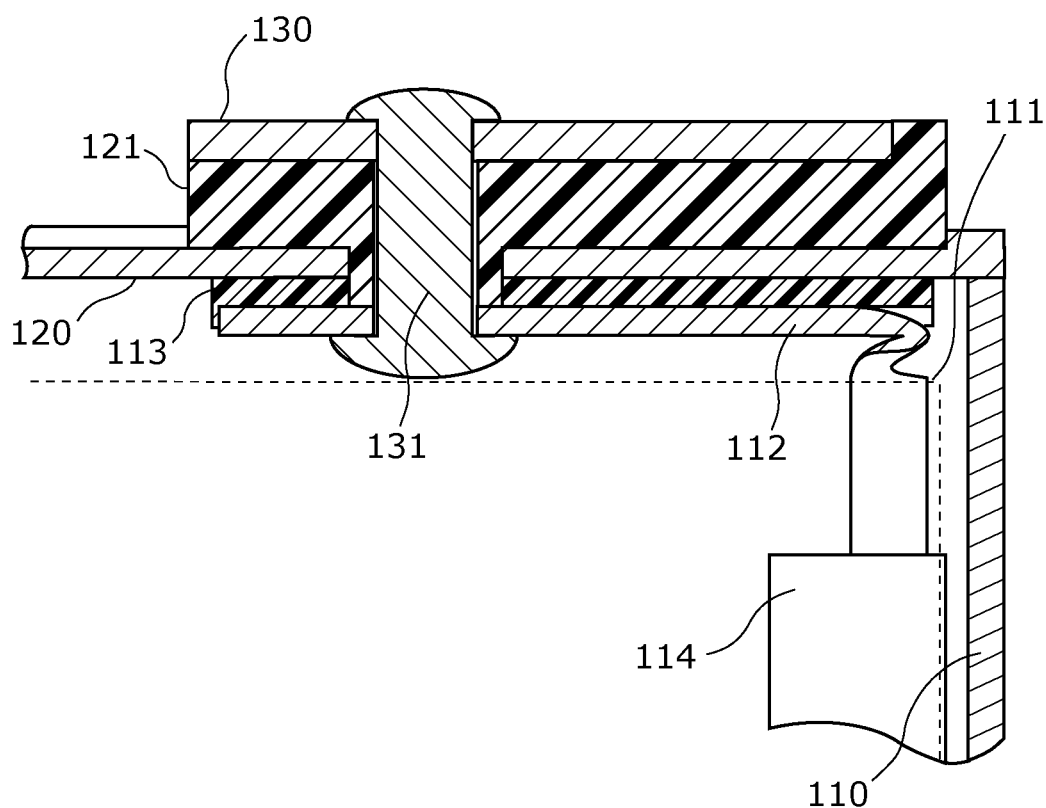
FIG. 10 is a cross-sectional view of the non-aqueous electrolyte secondary battery according to the conventional technique.

As describe above, in the non-aqueous secondary battery 100 in the Patent Literature, the member for connecting the electrode terminal 130 and the current collector 112 is required at the back surface area of the cap part area in which the electrode terminal 130 is disposed, and thus the connecting member has a certain volume in the inner space of the container 300. More specifically, as shown in FIG. 10, the internal insulation sealing member 113, the current collector 112, and the end part 131 of the electrode terminal 130 are present at the back side of the cap part 120 in the inner space of the container 300. Below these members, the electrode assembly 111 (see the part shown by the broken line in FIG. 10) is present. In addition, since the positive electrode side and the negative electrode side have the same or similar structure, an area without any member is inevitably produced in the inner space of the container 300. Specifically, the area is between the members at the positive electrode side and the members at the negative electrode side and between the electrode assembly 111 and the cap part 120. In other words, wasteful space is inevitably produced in the inner space of the container 300, and thus the housing efficiency is small.

Here, modifying the outer shape of the electrode assembly 111 may make it possible to house the modified electrode assembly in the area without any member in the inner space of the container 300 in the Patent Literature. However, in this case, the modified electrode assembly having a complex structure is required, producing the problems that it is difficult to manufacture the modified electrode assembly and that high cost and large energy are required for manufacturing the modified electrode assembly.

The present invention has been made in view of the aforementioned problems, with an aim to provide an energy storage element which easily increases the housing efficiency of an electrode assembly with respect to the capacity of a container.

Hereinafter, an embodiment of the present invention is described with reference to the drawings. The exemplary embodiment described below shows a specific preferable example. The numerical values, shapes, materials, structural elements, the arrangement and connection of the structural elements etc. shown in the following exemplary embodiment are mere examples, and therefore do not limit the scope of the present invention. Therefore, among the structural elements in the following exemplary embodiment, structural elements not recited in any one of the independent claims defining the most generic concept of the present invention are described as arbitrary structural elements in preferable implementations.

EMBODIMENT

Figure 1:
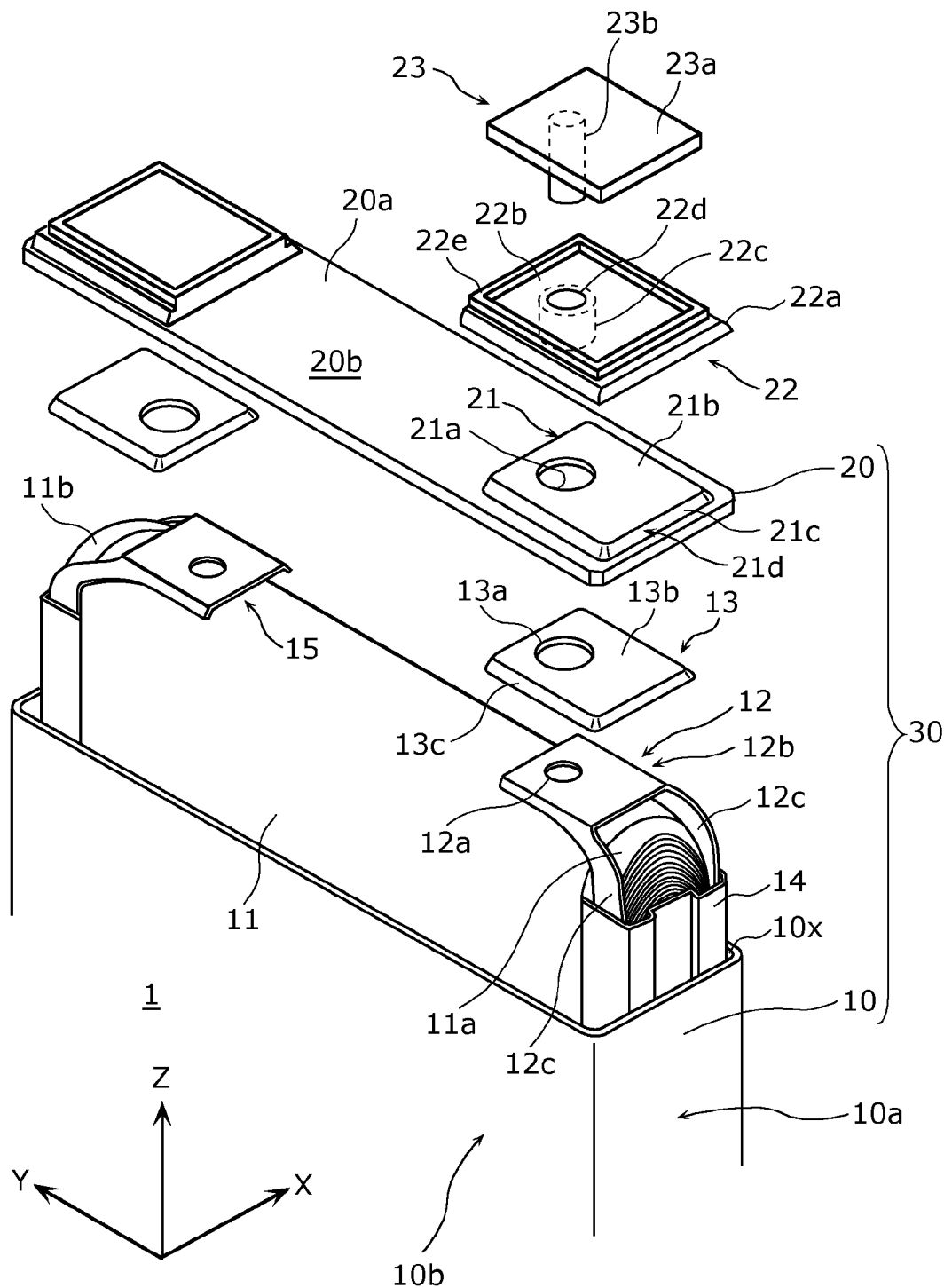
FIG. 1 is a schematic exploded perspective view of a non-aqueous electrolyte secondary battery having an exemplary structure according to an embodiment of the present invention.

FIG. 1 is a schematic exploded perspective view of a non-aqueous electrolyte secondary battery 1 having an exemplary structure according to an embodiment of the present invention.

As shown in FIG. 1, the non-aqueous electrolyte secondary battery 1 includes: a container 30; an electrode assembly 11 housed inside the container 30; an electrode terminal 23 provided at the container 30; current collectors 12 and 15 for electrically connecting the electrode terminal 23 and the electrode assembly 11; an external insulation sealing member 22 which insulates the container 30 and the electrode terminal 23; and an internal insulation sealing member 13 for insulating the container 30 and the current collectors 12 and 15.

The container 30 includes a cap part 20 and a container body 10. The cap part 20 is a member having a long plate shape extending in the Y-axis direction (described later). The container body 10 is a rectangular cylindrical member having an opening 10x at a first end and a bottom at a second end. In other words, the container 30 has an outer shape of an approximately rectangular cuboid, and includes a long first surface formed along the cap part 20 and a short side surface 10a as a second surface orthogonal to the first surface at the end portions in the longitudinal direction (Y-axis direction) of the first surface. In this embodiment, the direction in which the container body 10 and the cap part 20 are arranged is referred to as an upper-lower direction (the Z-axis direction in FIG. 1), the direction in which a positive terminal and a negative terminal are arranged is referred to as a left-right direction (the Y-axis direction in FIG. 1), and the direction perpendicular to the upper-lower direction and the left-right direction is referred to as a front-back direction (the X-axis direction in FIG. 1). In addition, the container body 10 of the container 30 includes the bottom surface (not shown) and side surfaces which are short side surfaces 10a formed along the lateral direction of the cap part 20 and long side surfaces 10b formed along the longitudinal direction of the cap part 20.

The cap part 20 includes, at each of the end parts in the lengthwise direction, a protrusion part 21 which protrudes outward from an upper surface 20b of the cap part 20 of the container 30 and a plate-shaped cap body 20a which is the part other than the protrusion part 21. Here, the upper surface 20b of the cap part 20 is an outer surface of the cap body 20a of the container 30. In other words, the cap part 20 of the container 30 includes a wall having an outer surface partly protrudes outward to be the protrusion part 21. The protrusion part 21 is formed at the position which is on the cap part 20 and apart from the short side surface 10a of the container body 10 of the container 30.

The protrusion part 21 includes a plate part 21b which is a top part and a side wall part 21d. The plate part 21b is a flat-plate shaped member which makes up the upper part of the protrusion part 21, has a shape of a rectangle having parallel sides in the X-axis direction and the Y-axis direction in a plan view, and is parallel to the cap body 20a. In addition, the protrusion part 21 includes the plate part 21b with a through-hole 21a for allowing penetration of the electrode terminal 23. Here, FIG. 1 shows only a through-hole 21a at the positive electrode side, and does not show a through-hole at the negative electrode side because the latter through-hole is hidden behind an insulation sealing member later described.

An electrode assembly 11 is formed by stacking band-shaped positive and negative electrodes with a separator inbetween and winding the whole stack in the shape of a long cylinder. The electrode assembly 11 is housed in the container 30 in the direction in which the winding axis direction matches the Y-axis direction and the long axis of the cross section of the long circle matches the Z-axis direction. The positive electrode and the negative electrode are shifted from each other in the winding axis direction and are wound about the winding axis direction in the shape of a long circle. The electrode assembly 11 includes projection parts 11a and 11b corresponding to the positive electrode and the negative electrode and each of which projects outward from a corresponding separator in the winding axis direction (the Y-axis direction) of the electrode assembly 11. In other words, the electrode assembly 11 includes the projection part 11a disposed at the positive electrode side and projecting from the separator at a first end in the winding axis direction, and the projection part 11b disposed at the negative electrode side and projecting from the separator at a second end in the winding axis direction. Furthermore, the projection part 11a at the positive electrode side and the projection part 11b at the negative electrode side do not include any active material, and thus metal foil which is a base material thereof is exposed. More specifically, the projection part 11a at the positive electrode side includes exposed aluminum foil which is the base material of the positive electrode without any positive electrode active layer, and the projection part 11b at the negative electrode side includes exposed cupper foil which is the base material of the negative electrode without any negative electrode active layer. To the projection part 11a at the positive electrode side and the projection part 11b at the negative electrode side, a current collector 12 at the positive electrode side and a current collector 15 at the negative electrode side are electrically connected, respectively.

The current collector 12 has an upper end part with a plate-shaped part (a plate part 12b1 later described) which is parallel to the upper surface of the electrode assembly 11 (which is parallel to the X-Y plane). The plate-shaped part has a through-hole 12a. The current collector 12 disposed at the positive electrode side which is a first end of the winding axis direction in which the electrode assembly 11 is wound has curved sides (arm parts 12c described later) which are along an outer side surface in the X-axis direction of the projection part 11a and which extend in the Z-axis direction. These curved sides are sandwiched by holding plates 14 made of aluminum or an aluminum alloy together with the projection part 11a at the positive electrode side, and are connected and fixed by ultrasonic welding or the like. The current collector 15 at the negative electrode side also has the same or similar structure, and is formed with cupper or a cupper alloy. The current collector 12 at the positive electrode side and the current collector 15 at the negative electrode side are the same or similar in structure. Thus, only the current collector 12 at the positive electrode side is described, and the current collector 15 at the negative electrode side is not described.

The structure of the current collector 12 (and the current collector 15) is described in detail later.

The internal insulation sealing member 13 is an insulation member which insulates the container 30 and the current collector 12 by being sandwiched between the cap part 20 and the base part 12b (see a later-provided description) of the current collector 12. In other words, the internal insulation sealing member 13 is an insulation member which is disposed inside the container 30 and is for insulating the container 30 from the electrode assembly 11 electrically connected via the current collector 12. In addition, the internal insulation sealing member 13 functions as a sealing member (packing) for sealing the through-hole 21a by being pressure-bonded to the through-hole 21a formed in the cap part 20 of the container 30 together with the electrode terminal 23 and the external insulation sealing member 22. The internal insulation sealing member 13 has a shape for covering the base part 12b of the current collector 12 from the side of the electrode terminal 23. The internal insulation sealing member 13 is made of a synthetic resin or the like, and has insulation and elastic properties. In addition to the through-hole 21a of the cap part 20 and the through-hole 12a of the current collector 12, the internal insulation sealing member 13 includes a through-hole 13a for allowing penetration of a connection part 23b (later described) of the electrode terminal 23.

The external insulation sealing member 22 is an insulation member which insulates the electrode terminal 23 and the container 30 by being sandwiched between the terminal body 23a (later described) of the electrode terminal 23 and the protrusion part 21 of the cap part 20. In other words, the external insulation sealing member 22 is an insulation member which is disposed outside the container 30 and is for insulating the container 30 from the electrode assembly 11 electrically connected via the electrode terminal 23 and the current collector 12. In addition, the external insulation sealing member 22 functions as a sealing member (packing) for sealing the through-hole 21a by being pressure-bonded to the through-hole 21a formed in the cap part 20 of the container 30 together with the electrode terminal 23 and the internal insulation sealing member 13. The external insulation sealing member 22 is disposed on the plate part 21b of the protrusion part 21, and includes a cylinder-shaped cylinder part 22c which is formed to be in contact with a through-hole 22d in the plate part 22b and to extend below the plate part 22b. In other words, the external insulation sealing member 22 includes the cylinder part 22c and the plate part 22b extending in the direction which is a direction crossing the axis of the cylinder part 22c and outward of the cylinder part 22c.

In addition, the external insulation sealing member 22 includes a side wall part 22a formed at the outer edge of the plate part 22b along side surfaces of the protrusion part 21. In other words, the external insulation sealing member 22 is a member including the plate part 22b and the side wall part 22a for covering the outside of the protrusion part 21.

The external insulation sealing member 22 is a member made of a synthetic resin, as in the case of the internal insulation sealing member 13. The through-hole 22d formed in the external insulation sealing member 22 allows penetration of the later-described electrode terminal 23 by means of the connection part 23b, in addition to the through-hole 21a formed in the cap part 20, the through-hole 13a formed in the internal insulation sealing member 13, and the through-hole 12a formed in the current collector 12.

In addition, the cylinder part 22c of the external insulation sealing member 22 is formed at the side (the lower side of the plate part 22b) facing the cap part 20, and has an inner edge which matches the through-hole 22d. In addition, the cylinder part 22c has an outer edge which fits into the through-holes 13a and 21a. Accordingly, the cylinder part 22c is sandwiched between the through-hole 21a formed in the protrusion part 21 of the container 30 and the connection part 23b of the electrode terminal 23. In other words, the external insulation sealing member 22 insulates the electrode terminal 23 and the container 30 by being sandwiched between the terminal body 23a of the electrode terminal 23 and the plate part 21b of the protrusion part 21 of the container 30 and being sandwiched between the connection part 23b of the electrode terminal 23 and the protrusion part area having the through-hole 21a in the cap part 20 of the container 30.

Furthermore, a frame body 22e is formed on the marginal area of the plate part 22b which is of the external insulation sealing member 22 and in which the through-hole 22d is formed.

The electrode terminal 23 includes a plate-shaped terminal body 23a disposed outside the protrusion direction of the protrusion part 21 on the cap part 20 of the container 30 and a column-shaped connection part 23b which penetrates the through-hole 21a formed in the recess part 21x. The terminal body 23a has a flat outer edge corresponding to the shape of the inner edge of the frame body 22e. The connection part 23b takes roles for electrically connecting the terminal body 23a and the current collector 12 and mechanically bonding the cap part 20 and the electrode assembly 11. The electrode terminal 23 disposed at the positive electrode side is made of aluminum or an aluminum alloy, and the electrode terminal disposed at the negative electrode side is made of cupper or a cupper alloy.

The electrode terminal 23 is a member for completing electrical connection between the non-aqueous electrolyte secondary battery 1 and an external load by means of the terminal being fixed by welding onto the surface of the terminal body 23a (the terminal is of the not-shown external load that is, a device which consumes electric energy of the non-aqueous electrolyte secondary battery 1). Otherwise, the electrode terminal 23 is a member for completing electrical connection between a plurality of non-aqueous electrolyte secondary batteries 1 (not-shown) arranged next to each other by means of the terminal bodies 23a of the respective non-aqueous electrolyte secondary batteries 1 being fixed by welding using a bus bar.

Here, the electrode terminal 23 may be configured such that the terminal body 23a and the connection part 23b thereof are made of the same material by forging, casting, or the like. In addition, the electrode terminal 23 may be configured such that the terminal body 23a and the connection part 23b thereof are independent of each other, and that the terminal body 23a and the connection part 23b are integrally formed using two different kinds of materials or the same material.

Figure 2:
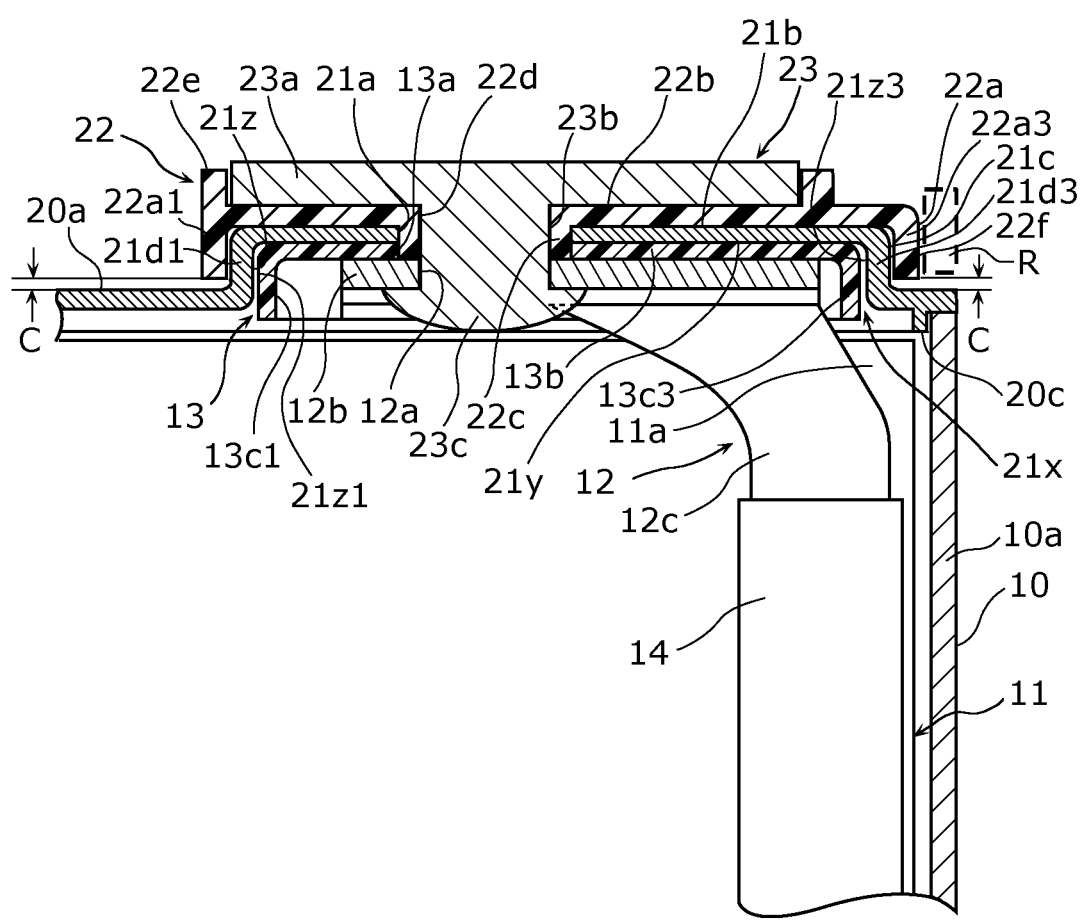
FIG. 2 is a cross-sectional view, in the Y-Z plane, of main parts around one of the electrode terminals of the non-aqueous electrolyte secondary battery.
Figure 3:
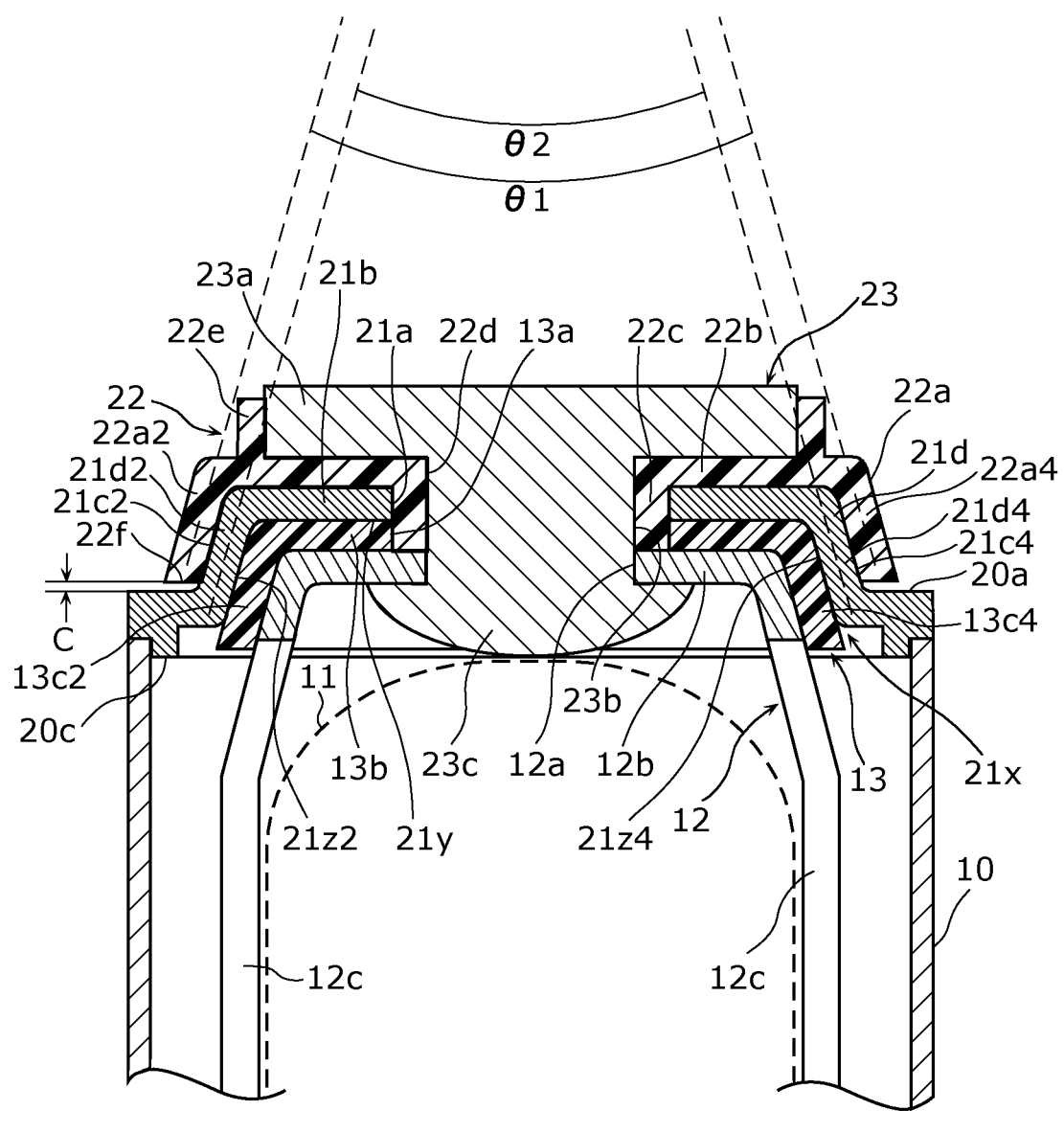
FIG. 3 is a cross-sectional view, in the X-Z plane, of main parts around the electrode terminals of the non-aqueous electrolyte secondary battery.

Next, with reference to FIG. 2 and FIG. 3, a detailed description is given of the structure of main parts around the electrode terminal 23 and the current collector 12 of the non-aqueous electrolyte secondary battery 1 according to this embodiment. FIG. 2 is a cross-sectional view, in the Y-Z plane, of main parts around one of the electrode terminals of the non-aqueous electrolyte secondary battery 1 already assembled as shown in FIG. 1. FIG. 3 is a cross-sectional view, in the X-Z plane, of the main parts around the electrode terminal of the non-aqueous electrolyte secondary battery 1 shown in FIG. 1.

As shown in FIG. 2 and FIG. 3, the structure of the main parts around the electrode terminal 23 and the current collector 12 of the non-aqueous electrolyte secondary battery 1 is a stack of the electrode terminal 23, the external insulation sealing member 22, the protrusion part 21 of the cap part 20, the internal insulation sealing member 13, and the plate part 12b1 of the current collector 12 stacked from above in the listed order. The external insulation sealing member 22 is disposed such that the plate part 22b is stacked on a plate part 21b of the protrusion part 21 on a plate part 13b (see a later-provided description) of the internal insulation sealing member 13, and that the cylinder part 22c penetrates through the through-hole 21a formed in the cap part 20 and the through-hole 13a formed in the internal insulation sealing member 13. The cylinder part 22c has an end surface which is on the same plane on which the lower surface of the internal insulation sealing member 13 is present and, together with the lower surface of the internal insulation sealing member 13, is above the upper surface of the plate part 12b1 which forms the principal surface of the current collector 12. The inner circumference of the cylinder part 22c of the external insulation sealing member 22 and the through-hole 12a of the current collector 12 are approximately the same in size and shape. The cylinder part 22c and the through-hole 12a are penetrated by the connection part 23b of the electrode terminal 23. In other words, the outer circumference of the connection part 23b is in contact with the inner circumference of the cylinder part 22c and the through-hole 12a in the current collector 12. The connection part 23b of the electrode terminal 23 has a riveted end 23c formed in the state where the connection part 23b already penetrates through the cylinder part 22c of the external insulation sealing member 22 and the through-hole 12a formed in the current collector 12. In other words, the electrode terminal 23 having the riveted end 23c as a pressure-bonding end part for pressure-bonding the cap part 20 of the container 30 and the current collector 12 etc., and is thereby electrically connected to the current collector 12.

Since the outer diameter of the riveted end 23c is larger than the diameters of the respective through-holes 21a, 22d, 13a, and 12a, the external insulation sealing member 22, the cap part 20, the internal insulation sealing member 13, and the current collector 12 are pressure-bonded to each other and integrally fixed by being sandwiched by the terminal body 23a of the electrode terminal 23 and the riveted end 23c. In this way, the electrode terminal 23 pressure-bonds the protrusion part 21 of the container 30 and the external insulation sealing member 22, and thereby seals the protrusion part area having the through-hole 21a in the cap part 20 of the container 30 and the electrode terminal 23, using the external insulation sealing member 22 and the internal insulation sealing member 13. In addition, since the electrode terminal 23 is into contact with the current collector 12 at the connection part 23b and the riveted end 23c, the electrode terminal 23 is electrically connected to the current collector 12 in a state where the electrode terminal 23 already penetrates through the protrusion part 21 of the cap part 20 via the through-hole. Here, since the side surface of the connection part 23b is covered by the cylinder part 22c of the external insulation sealing member 22, the cap part 20 and the connection part 23b are securely in an insulated state.

Next, the structures of the respective parts are described.

As shown in FIG. 2 and FIG. 3, the cap part 20 in this embodiment is formed to have, on the back side (the lower side), a frame part 20c having an outer shape matching the inner edge shape of an opening 10x of the container body 10 so as to fit into the opening 10x. The frame part 20c is formed inside the side end which is of the cap part 20 and abuts the upper end surface of the container body 10. In other words, the cap part 20 is configured to have a larger thickness in the area with the frame part 20c than in the other area of the cap part 20. In addition, the cap part 20 has the largest thickness in the area with the frame part 20c, the second largest thickness in the area outside the frame part 20c, and the smallest thickness in the area inside the frame part 20c.

In addition, each of the structural members of the cap part 20 has a cross section having an approximately even thickness. The cap part 20 has a recess part 21x corresponding to the protrusion part 21, at the back side of the protrusion part 21. In other words, the protrusion part 21 of the cap part 20 is formed, for example, by pressing plate-shaped member having an even thickness to form a protrusion and a recess therein. In other words, the container 30 includes the cap part 20 having the protrusion part 21 and also having the recess part 21x formed at the position which is in the inner surface of the wall of the container 30 and corresponds to the position of the protrusion part 21 when the protrusion part 21 is formed. The recess part 21x includes a bottom surface 21y which is the lowermost surface, and a side surface 21z continuously formed between the bottom surface 21y and the inner surface of the wall of the container 30. Accordingly, the cap part 20 includes a side wall part 21d which forms a side surface 21c of the protrusion part 21 and a side surface 21z of the recess part 21x. As shown in FIG. 2 and FIG. 3, in a plan view, the side wall part 21d is formed (i) to be continuous from the outer edge of the rectangular-shaped plate part 21b to the cap body 20a along the lateral direction (X-axis direction) of the cap part 20 and the longitudinal direction (Y-axis direction), and along a direction crossing the cap body 20a. The side wall part 21d has four side parts 21d1, 21d2, 21d3, and 21d4 facing four directions. Adjacent ones of the four side parts 21d1, 21d2, 21d3, and 21d4 are continuous to each other. Among the four side parts 21d1, 21d2, 21d3, and 21d4, the paired side parts 21d1 and 21d3 continuous to the outer edge in the lateral direction (X-axis direction) of the plate part 21b of the protrusion part 21 are formed to be bent perpendicularly with respect to the cap body 20a and the plate part 21b (see FIG. 2). In addition, among the four side parts 21d1, 21d2, 21d3, and 21d4, the paired side parts 21d2 and 21d4 continuous to the outer edge in the longitudinal direction (Y-axis direction) of the plate part 21b of the protrusion part 21 are formed by being bent with larger tilts in the opposite directions at the positions closer to the cap body 20a (see FIG. 3). In other words, the first side wall 21c2 and the second side wall 21c4 at the outer side in the X-axis direction of the paired side parts 21d2 and 21d4 in the Y-axis direction of the side wall part 21d are tilted so as to be farther apart from each other at the positions closer to the upper surface 20b of the cap part 20. The side surface 21z of the recess part 21x is a surface which faces the paired first wall parts 12b2 (later described) of the base part 12b of the current collector 12 through the side wall parts 13c (later described) of the internal insulation sealing member 13. The recess part 21x has the side surface 21z with paired side surface portions 21z2 and 21z4 facing the paired first wall parts 12b2 of the base part 12b of the current collector 12. The paired side surface portions 21z2 and 21z4 are tilted so as to be farther apart from each other at positions more distant from the bottom surface 21y of the recess part 21x.

The internal insulation sealing member 13 has a plate part 13b and a side wall part 13c as the second wall part, similarly to the protrusion part 21 formed in the cap part 20. The internal insulation sealing member 13 has an upper-part shape corresponding to the shape of the recess part 21x. The plate part 13b has the shape of a flat plate parallel to the plate part 21b of the protrusion part 21, and, in a plan view, has the shape of a rectangle with the sides each parallel to the X-axis direction or Y-axis direction. The plate part 13b includes the aforementioned through-hole 13a formed therein. The side wall part 13c is formed to perpendicularly extend from the outer edge of the plate part 13b toward the electrode assembly 11 (that is, downward). The side wall part 13c has four side parts of 13c1, 13c2, 13c3, and 13c4 facing four directions. Adjacent ones of the four side parts 13c1, 13c2, 13c3, and 13c4 are continuous to each other. The side wall part 13c is parallel to the inner surface of the aforementioned side wall part 21d. In other words, among the four side parts 13c1, 13c2, 13c3, and 13c4, the paired side parts 13c1 and 13c3 respectively extend from the paired side parts in the X-axis direction of the plate part 13b are formed to be perpendicular to the plate part 13b. Among the four side parts 13c1, 13c2, 13c3, and 13c4, the paired side parts 13c2 and 13c4 are formed to respectively extend, with a tilt, from the paired side parts in the Y-axis direction of the plate part 13b, so as to be farther apart from each other at the positions closer to the bottom part. As shown in FIG. 3, the inner surfaces of the paired side parts 21d2 and 21d4 at opposite sides and the outer surfaces of the paired side parts 13c2 and 13c4 are in contact with each other. The paired side parts 21d2 and 21d4 among the side parts of the side wall part 21d are continuous from the outer edge in the longitudinal direction of the plate part 21b of the protrusion part 21, and the paired side parts 13c2 and 13c4 extend from respectively corresponding two of the side parts in the Y-axis direction of the plate part 13b of the internal insulation sealing member 13. In addition, the internal insulation sealing member 13 faces the side surface 21z of the recess part 21x and includes second wall parts enclosing the paired first wall parts 12b2 of the base part 12b of the current collector 12.

Furthermore, the external insulation sealing member 22 positioned at the upper part of the protrusion part 21 of the cap part 20 has a shape corresponding to the shape of the protrusion part 21 as in the case of the internal insulation sealing member 13. In the external insulation sealing member 22, the lower surface of the plate part 22b is in contact with the upper surface of the plate part 21b of the protrusion part 21, and the side wall part 22a extending from the outer edge of the plate part 22b and below the bottom part of the plate part 22b has a shape matching the shape of the side wall part 21d which forms the side surface of the protrusion part 21. The side wall part 22a has four side parts 22a1, 22a2, 22a3, and 22a4 facing four directions. Adjacent ones of the four side parts 22a1, 22a2, 22a3, and 22a4 are continuous to each other. Among the four side parts 22a1, 22a2, 22a3, and 22a4, the paired side parts 22a1 and 22a3 which extend downward from the paired side parts in the X-axis direction of the plate part 22b are formed to be perpendicular to the plate part 22b. Among the four side parts 22a1, 22a2, 22a3, and 22a4, the paired side parts 22a2 and 22a4 which extend downward from the paired side parts in the Y-axis direction of the plate part 22b are tilted so as to be farther apart from each other at the positions closer to the upper surface 20b of the cap part 20 of the container 30. In other words, the side wall part 22a of the external insulation sealing member 22 includes: a part 22a2 of the side wall part 22a as the first side wall part disposed along the part (the first side wall 21c2) of a side surface of a first protrusion part 21; and a part 22a4 of the side wall part 22a as the second side wall part disposed along the part (the second side wall 21c4) of a side surface of a second protrusion part 21 which is disposed at the side opposite to the first side wall part.

Here, the first angle θ1 formed by the part 22a2 and the part 22a4 of the side wall part 22a is equal to the second angle θ2 formed by the first side surface 21c2 and the second side surface 21c4. In other words, the inner surface of the part 22a2 in the X-axis direction of the side wall part 22a and the first side wall 21c2 are closely in contact with each other, and the inner surface of the part 22a4 in the X-axis direction of the side wall part 22a and the second side wall 21c4 are closely in contact with each other.

In addition, the distance in the Z-axis direction between the lower surface of the plate part 22b and the bottom end of the side wall part 22a is less than the distance in the Z-axis direction from the upper surface 20b of the cap body 20a to the upper surface of the plate part 21b of the protrusion part 21. In other words, as shown in FIG. 2 and FIG. 3, in the state where the external insulation sealing member 22, the cap part 20, the internal insulation sealing member 13, and the current collector 12 are sandwiched by the terminal body 23a of the electrode terminal 23 and the riveted end 23c and thereby being pressure-bonded to each other, the end surface 22f of the end part of the side wall part 22a (that is, the lower end of the side wall part 22a) at the side of the upper surface 20b of the cap part 20 of the container 30 is apart from the upper surface 20b of the cap part 20 by predetermined spacing C.

In this way, in the non-aqueous electrolyte secondary battery 1 in this embodiment, the cap part 20 has a protrusion part 21 and a corresponding recess part 21x, and the external insulation sealing member 22 and the internal insulation sealing member 13 have shapes matching the shapes of the protrusion part 21 and the recess part 21x.

Figure 4:
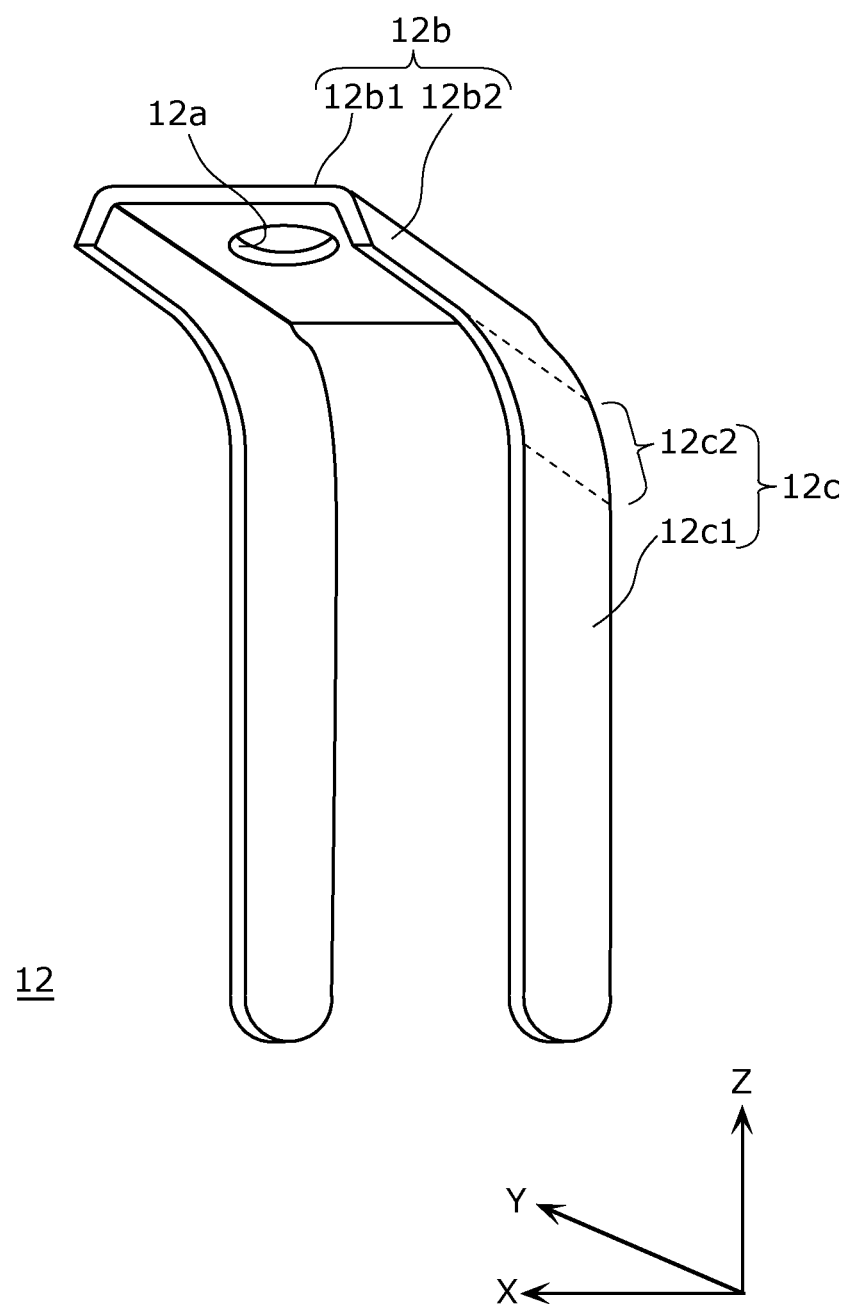
FIG. 4 is a perspective view of one of the current collectors of the non-aqueous electrolyte secondary battery.

Next, with reference to FIG. 4, FIGS. 5A and 5B, the structure of the current collector 12 is described in detail. FIG. 4 is a perspective view looking up the current collector 12. FIG. 5A is a view in the Y-axis direction, and FIG. 5B is a view in the X-axis direction.

As shown in the diagrams, the current collector 12 is formed by, for example, press-bending a single metal plate, and includes a base part 12b including a part having a flat plate shape, and paired arm parts 12c which extend downward from both the ends in the X-axis direction of the base part 12b. In addition, the base part 12b of the current collector 12 is connected to the electrode terminal 23 in the recess part 21x. The arm part 12c of the current collector 12 extends from the base part 12b toward the side opposite to the protrusion direction of the protrusion part 21 (that is, below the cap part 20), and is connected to the electrode assembly 11.

As shown in FIG. 4 and FIG. 5A, the base part 12b includes a flat-plate shaped plate part 12b1 having a through-hole 12a formed therein, and paired first wall parts 12b2 formed by bending at paired sides in the Y-axis direction of the plate part 12b1. The plate part 12b1 is formed along the bottom surface 21y of the recess part 21x. The paired first wall parts 12b2 are formed continuously from opposing sides of the plate part 12b1 such that the paired first wall parts 12b2 have inner ends facing the side surface 21z of the recess part 21x. The paired first wall parts 12b2 included in the base part 12b are tilted so as to be farther apart from each other at positions more distant from the plate part 12*b*1 such that the paired first wall parts 12*b*2 have inner ends facing the side surface 21*z* which is the inner surface of the side wall part 21*d* of the recess part 21*x* in the cap part 20 shown in FIG. 3. Each of the paired first wall parts 12*b*2 is continuous to the corresponding one of the paired arm parts 12*c* at its end part in the Y-axis direction of the container 30 (the right side in FIG. 5B). In other words, the respective first wall parts 12*b*2 are continuous to the arm part 12*c* at only portions thereof closer to the projection part 11*a* of the electrode assembly 11. In other words, the arm part 12*c* of the current collector 12 is continuous from the paired first wall parts 12*b*2, and extends from the base part 12*b* downward and below the cap part 20.

Next, each of the paired arm parts 12*c* includes an arm body 12*c*1 connected to the electrode assembly 11 and a bridge part 12*c*2 which bridges the arm body 12*c*1 and the first wall part 12*b*2. Each of the paired arm bodies 12*c*1 is a long flat plate which extends from the plate part 12*b*1 downward in the direction orthogonal to the plate part 12*b*1 along the side surface of the projection part 11*a* in the X-axis direction at the positive electrode side of the electrode assembly 11. In short, the paired arm bodies 12*c*1 are parallel to each other. As shown in FIG. 3, the paired arm bodies 12*c*1 sandwich the electrode assembly 11 therebetween. The arm part 12*c* of the current collector 12 is connected to the electrode assembly 11 at a position in the Y-axis direction closer to the short side surface 10*a* of the container 30 than to the position of the protrusion part 21 inside the container 30. In addition, the bridge part 12*c*2 connects the arm body 12*c*1 and the paired first wall parts 12*b*2 of the base part 12 by being, when viewed in the X-axis direction, curved from the recess part 21*x* toward the side of the short side surface 10*a* of the container 30. In other words, as shown in FIG. 5B, in the Y-axis direction of the container 30, an edge e2 which is of the arm part 12*c* of the current collector 12 and at the side of the short side surface 10*a* of the container body 10 of the container 30 is positioned closer to the short side surface 10*a* of the container body 10 of the container 30 than an edge e1 which is of the base part 12*b* of the current collector 12 and at the side of the short side surface 10*a*.

Here, as shown in FIG. 5B, the end portions of the paired arm bodies 12*c*1 are round when seen from a viewpoint in the X-axis direction. By configuring the arm bodies 12*c*1 to have round end portions, it is prevented that the surface of the electrode assembly 11 is damaged when the electrode assembly 11 is connected to the current collector 12. It is to be noted that the arm bodies 12*c*1 may be configured to have rectangular end portions instead of round end portions.

On the other hand, as shown in FIG. 5A, each of the paired bridge parts 12*c*2 has the same angle with respect to the plate part 12*b*1 of the base part 12*b* as the angle of the first wall part 12*b*2 with respect to the plate part 12*b*1 of the base part 12*b*. In other words, the bridge parts 12*c*2 are paired structural elements of the current collectors 12 formed along the lines extending from the paired first wall parts 12*b*2. In addition, each of the bridge parts 12*c*2 has a shape, when viewed in the Y-axis direction, of a bent continuous both to the corresponding one of the paired first wall parts 12*b*2 and the corresponding one of the paired arm bodies 12*c*1 along the inner shape of the recess part 21*x*. The paired bridge parts 12*c*2 are tilted so as to be farther apart from each other at the positions closer to the bottom part. Since the paired first wall parts 12*b*2 and the paired bridge parts 12*c*2 are tilted in this way, each of the plate parts 12*b*1 directly in contact with the plate parts 13*b* of the internal insulation sealing members 13 has, in the X-axis direction of the upper surface of the plate part 12*b*1, a width W1 smaller than a width W2 which is the spacing between the paired arm bodies 12*c*1. Since the paired first wall parts 12*b*2 and the bridge parts 12*c*2 are formed along the extension lines, and the arm parts 12*c* and the base parts 12*b* of the current collector 12 are integrally formed, it is easy to form the arm parts 12*c* and base parts 12*b* of the current collectors 12 having sufficient strength and form the paired arm parts 12*c* precisely.

In addition, as shown in FIG. 2, FIG. 4, and FIG. 5B, the bridge part 12*c*2 extends from the first wall part 12*b*2 of the base part 12*b* in the direction toward the Y-axis direction end part of the container 30 such that the arm body 12*c*1 is positioned at the Y-axis direction end part side of the container 30. In this way, the outer side of the arm body 12*c*1 extends to a point outer than an outer end e of the plate part 12*b*1.

In the non-aqueous electrolyte secondary battery 1 according to this embodiment, the container 30 includes a cap part 20 with a protrusion part 21 formed thereon, and further includes a recess part 21*x* formed, when the protrusion part 21 is formed, at the position which is on an inner surface of the cap part 20 of the container 30 and corresponds to the position of the protrusion part 21. The current collector 12 electrically connected to the electrode terminal 23 inside the container 30 includes a base part 12*b* connected to the electrode terminal 23 inside the recess part 21*x*. The current collector 12 includes an arm part 12*c* which extends from the base part 12*b* housed in the recess part 21*x* and below the protrusion part 21 of the cap part 20 and which is connected to the electrode assembly 11.

In this way, the base part 12*b* which is a part connected to the electrode terminal 23 of the current collector 12 is housed in the recess part 21*x* formed in the cap part 20 of the container 30. Thus, it is possible to adjust the area other than the area of the recess part 21*x* in the inner space of the container 30 to the shape of the electrode assembly 11. In this way, it is possible to reduce wasteful space produced when the electrode assembly 11 is housed inside the container 30 only by adjusting the outer size of the electrode assembly 11 to the size of the inner space. In this way, the shape of the container 30 is adjusted to the shape of the electrode assembly 11 without changing the structure of the electrode assembly 11 from, for example, the shape of a long cylinder for winding type. Therefore, it is possible to easily increase the housing efficiency of the electrode assembly 11 with respect to the inner space (capacity) of the container 30.

In the non-aqueous electrolyte secondary battery 1 according to this embodiment, the current collector 12 includes the base part 12*b* in which paired first wall parts 12*b*2 are tilted so as to be farther apart from each other at positions more distant from a plate part 12*b*1 of the base part 12*b*. The current collector 12 includes paired arm parts 12*c* which are continuous from portions which are of the paired first wall parts 12*b*2 and at the side of the short side surface 10*a* of the container body 10 and which extend from the base part 12*b* and below the protrusion part 21 of the cap part 20. In other words, the paired arm parts 12*c* extend toward the electrode assembly 11 in a state where the arm part portions continuous from the paired first wall parts 12*b*2 of the base part 12*b* are apart from each other more than the width of the plate part of the based part (the arm part portions are the portions in the proximity of the boundaries between the respectively corresponding paired first wall parts 12*b*)

In this embodiment, since the non-aqueous electrolyte secondary battery 1 is configured to sandwich the projection part 11*a* of the electrode assembly 11 from the outside in the X-axis direction of the electrode assembly 11 by means of the paired arm parts 12*c* of the current collector 12, it is possible to secure wide spacing between the paired arm parts 12c. In this way, it is possible to make the spacing W2 between the paired arm parts 12c wider than the width W1 in the X-axis direction of the base part 12b. Here, the spacing W2 is the width of the portion which is of the electrode assembly 11 in the X-axis direction and is sandwiched by the paired arm parts 12c. In other words, it is possible to secure space for housing the electrode assembly 11 to be housed inside the container 30, and to further increase the housing efficiency of the electrode assembly 11 with respect to the inner space (capacity) of the container 30.

In addition, in the non-aqueous electrolyte secondary battery 1 according to this embodiment, the current collector 12 includes the paired arm parts 12c which are bonded through the electrode assembly 11 sandwiched therebetween. In this way, it is possible to bond the electrode assembly 11 and the arm parts 12c of the current collector 12 more strongly.

In addition, in the non-aqueous electrolyte secondary battery 1 according to this embodiment, the recess part 21x formed in the cap part 20 has side surfaces 21z in which paired portions 21z2 and 21z4 facing the paired first wall parts 12b2 of the base part 12b of the current collector 12 are tilted so as to be farther apart from each other at positions more distant from a bottom surface 21y of the recess part 21x, as in the case of the paired first wall parts 12b2. In other words, it is possible to bond the recess part 21x and the base part 12b of the current collector 12 more strongly by configuring the recess part 21x to have side surfaces 21z in which paired portions 21z2 and 21z4 facing the paired first wall parts 12b2 of the base part 12b are tilted suitably for the tilted paired first wall parts 12b2 of the base part 12b of the current collector 12, as in the case of the paired first wall parts 12b2. In addition, it is possible to secure a wide space for housing a bonding tool used to bond the electrode terminal 23 and the base part 12b of the current collector 12. Thus, it is possible to increase the operability in the manufacturing.

In addition, in the non-aqueous electrolyte secondary battery 1 in this embodiment, the internal insulation sealing member 13 has a side wall part 13c positioned between the side surface 21z of the recess part 21x formed in the cap part 20 of the container 30 and the first wall part 12b2 of the base part 12b of the current collector 12. With this, the internal insulation sealing member 13 can reliably insulate the container 30 and the current collector 12. In addition, since the side wall part 13c of the internal insulation sealing member 13 is positioned along the side surface 21z of the recess part 21x of the cap part 20 of the container 30, it is possible to bring the container 30 and the internal insulation sealing member 13 into close contact with each other in a more reliable manner. Therefore, it is possible to increase the air-tightness of the container 30.

In addition, in the non-aqueous electrolyte secondary battery in this embodiment, the container 30 has the shape of an approximately rectangular cuboid. The protrusion part 21 is formed at a position which is above the cap part 20 of the container 30 and which is distant from the short side surface 10a which is of the container body 10 and orthogonal to the cap part 20. Accordingly, the protrusion part 21 is not formed at least at the end portion in the longitudinal direction of the cap part 20. In addition, the protrusion part 21 is not formed at the end portion in the lateral direction of the cap part 20.

This is because the cap part 20 of the container 30 and a container body 10 are bonded by welding. In other words, the performance of the non-aqueous electrolyte secondary battery 1 may be reduced due to the influence of heat produced by welding, and thus there is a need to take a countermeasure to prevent the welding heat from conducting into the non-aqueous electrolyte secondary battery 1. For this reason, there is a need to secure space for housing a heat sink at the end portion which is of the cap part 20 of the container 30 and at which the welding is performed. Here, the heat sink is for releasing the welding heat outside the non-aqueous electrolyte secondary battery 1. As described above, the protrusion part 21 is not formed at the end portions of the cap part 20 in the longitudinal and lateral directions in the non-aqueous electrolyte secondary battery 1 in this embodiment. Thus, it is possible to utilize a range R (see the range shown by a broken line in FIG. 2) at the end portion of the cap part 20 at which the welding is performed as the space for housing the heat sink for releasing the welding heat outside the non-aqueous electrolyte secondary battery 1. Since the range R for housing the heat sink for releasing the welding heat is secured in the cap part 20 in this way, it is possible to easily house the heat sink therein and to manufacture the non-aqueous electrolyte secondary battery 1 with intact performance.

In addition, in the container 30 having the protrusion part 21, bridge parts 12c2 of the arm parts 12c of the current collector 12 curves along the inner shape of the recess part 21x. Thus, it is possible to approximate the shapes of the arm parts 12c of the current collector 12 to the outer shape of the electrode assembly 11 when viewed in the Y-axis direction. In this way, it is possible to approximate the shapes of the arm parts 12c when viewed from the Y-axis direction to the outer shape of the electrode assembly 11 when viewed from the Y-axis direction. Thus, it is possible to further increase the housing efficiency of the electrode assembly 11 with respect to the capacity of the container 30.

Furthermore, as described above, in the container 30 having the protrusion part 21 configured considering the space for housing the heat sink, each of the bridge parts 12c2 of the arm parts 12c of the current collector 12 has a shape with a curve starting at the position for the protrusion part 21 toward the side of the short side surface 10a of the container body 10 of the container 30. In addition, the current collector 12 is provided such that edges e2 in the Y-axis direction of the arm parts 12c at the side of the short side surface 10a are closer to the short side surface 10a than edges e1 in the Y-axis direction of the base part 12b at the side of the short side surface 10a. In other words, the arm parts 12c of the current collector 12 is connected to the electrode assembly 11 at the side closer to the short side surface 10a. In this way, it is possible to make the current collector 12 closer, as much as possible, to the short side surface 10a which is of the container body 10 and positioned at the end portion in the longitudinal direction (Y-axis direction) of the long side surface 10b of the container body 10 of the container 30. For this reason, it is possible to allow the electrode assembly 11 to occupy not only the space closer to the cap part 20 in the inner space of the container 30 but also the space closer to the short side surface 10a while securing the range R for bringing the heat sink and the cap part 20 into contact with each other. Therefore, it is possible to further increase the housing efficiency of the electrode assembly 11 with respect to the capacity of the container 30.

However, the present invention is not limited to the above embodiment.

Figure 6:
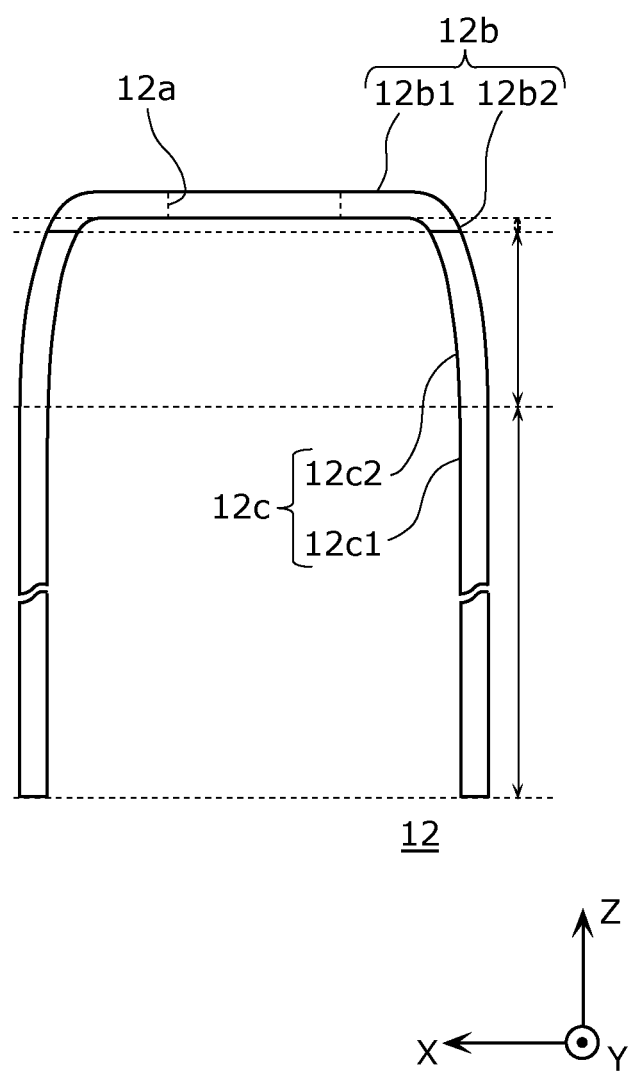
FIG. 6 is a view of one of exemplary current collectors when viewed in the Y-axis direction in a non-aqueous electrolyte secondary battery according to the present invention.

As shown in FIG. 5A, it is assumed here that, in the non-aqueous electrolyte secondary battery 1 according to this embodiment, the bridge parts 12c2 of the arm parts 12c of the current collector 12 when viewed in the Y-axis direction are continuous from the paired first wall parts 12b2 and the paired arm bodies 12c1 and have a bent along the inner shape of the recess part 21x. However, the bridge parts 12c2 do not always need to be continuous and have a bent in such a manner. For example, as shown in FIG. 6, the bridge parts 12c2 of the arm parts 12c of the current collector 12 may have a curve along the paired first wall part 12b2 and the paired arm bodies 12c1. In this case, the bridge parts 12c2 when viewed in the Y-axis direction are approximated more closely to the outer shape of the electrode assembly 11 when viewed in the Y-axis direction. Thus, it is possible to further increase the housing efficiency. In addition, since it is possible to form the bridge parts 12c2 to have curved surfaces instead of flat surfaces, it is possible to provide the bridge parts 12c2 having a rigidity larger than a rigidity obtainable when forming the bridge parts 12c2 to have a shape with a bent at the boundaries between the paired first wall parts 12b2 and the paired arm bodies 12c1 when viewed in the Y-axis direction of the current collector 12.

Figure 7A:
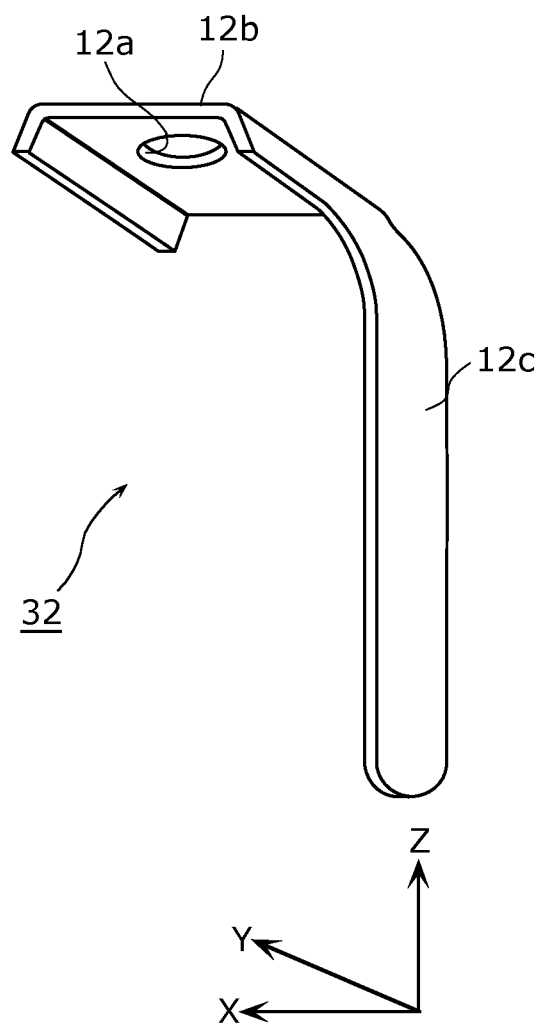
FIG. 7A is a perspective view of one of exemplary current collectors in a non-aqueous electrolyte secondary battery according to the present invention.

In addition, although the current collector 12 includes the paired arm parts 12c in the non-aqueous electrolyte secondary battery 1 in this embodiment, the current collector 12 does not always need to include the paired arm parts 12c. For example, a current collector 32 including a single arm part 12c as shown in FIG. 7A may be employed instead of the current collector 12. Alternatively, a current collector including three or more arm parts may be employed instead of the current collector 12. In short, the current collector according to the present invention is not limited by the number of arms thereof as long as electrical connection with the electrode assembly 11 is secured for the current collector. The number of arm parts 12c of the current collector does not always need to be two as long as each of at least one arm part needs to have an arm body 12c1 connected to the electrode assembly 11 and a bridge part 12c2 which connects the arm body 12c1 and the paired first wall parts 12b2.

In addition, in the non-aqueous electrolyte secondary battery 1 in this embodiment, the base part 12b of the current collector 12 has the paired first wall parts 12b2 at the side of the arm bodies 12c (that is, the both end sides in the X-axis direction). In other words, the arm parts 12c and the paired first wall parts 12b2 are integrally formed. Thus, it is possible to provide the advantageous effect of increasing the rigidity of the arm parts 12c of the current collector 12.

Figure 7B:
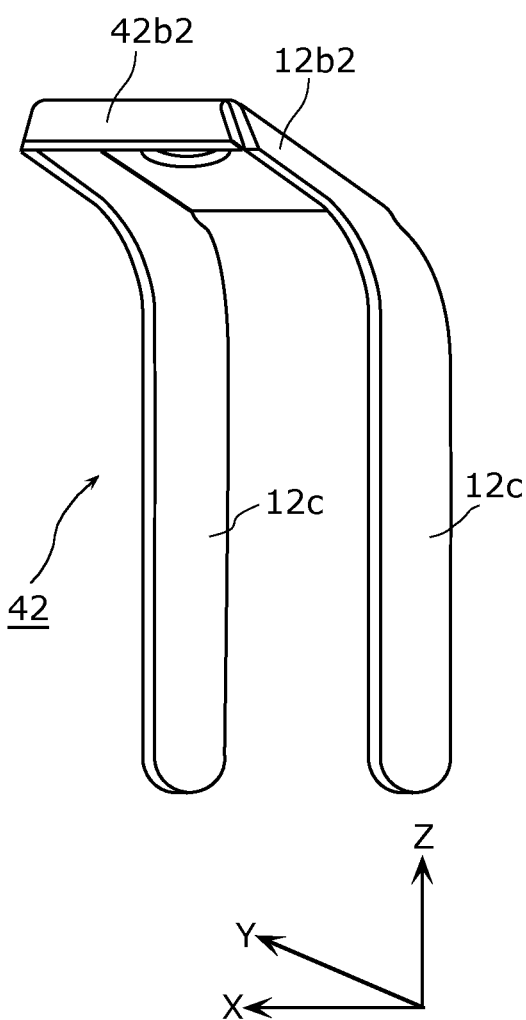
FIG. 7B is a perspective view of one of exemplary current collectors in a non-aqueous electrolyte secondary battery according to the present invention.

However, as shown in FIG. 7B, it is also possible to employ a current collector 42 having a base part 42b which has first wall parts 42b2 at the sides without the arm parts 12c (that are, the both end sides in the Y-axis direction). With this, it is possible to increase the bending rigidity in the X-axis direction of the current collector 42. For this reason, it is possible to communicate the pressure by a rivet of the electrode terminal 23 evenly especially in the X-axis direction of the internal insulation sealing member 13 and the like stacked above, and thereby bond the members around the electrode terminal 23 more strongly. Although FIG. 7B shows an example where the first wall parts 42b2 are positioned at the sides closer to the center of the cap part 20 in the longitudinal direction, it is possible to bond the members more strongly by forming other first wall parts also at the sides closer to the end part of the cap part 20 in the longitudinal direction.

In other words, the paired first wall parts 12b2 of the base part 12b of the current collector 12 provide advantageous effects as described below irrespective of the positions of the paired first wall parts 12b2 in the plate part 12b1 of the base part 12b. Vibration added to the container 30 vibrates the electrode assembly 11 more significantly when the lengths of the arm parts 12c of the current collector 12 are larger, stress due to the vibration added to the container 30 or the vibration of the electrode assembly 11 due to the added vibration is easily added also to the base part 12b which supports the electrode assembly 11. By forming the base part 12b having wall parts such as the paired first wall parts 12b2, it is possible to increase resistance to such stress and increase the reliability of the non-aqueous electrolyte secondary battery 1.

Alternatively, it is also possible to configure the non-aqueous electrolyte secondary battery 1 to include (i) a base part 12b which does not have any wall parts and (ii) arm parts 12c which directly extend downward from the plate part 12b1. More specifically, it is also possible to configure the non-aqueous electrolyte secondary battery 1 to include (i) a base part 12b without wall parts in contact with the entire sides in the Y-axis direction of the plate part 12b1 and (ii) arm parts 12c which directly extend from portions which are of the sides in the Y-axis direction of the plate part 12b1 and closer to the short side surfaces 10a of the container body 10. In this case, it is possible to easily manufacture the non-aqueous electrolyte secondary battery 1 because of the simplification of the manufacturing processes. Thus, it is possible to reduce the manufacturing cost.

In the non-aqueous electrolyte secondary battery 1 in this embodiment, the recess part 21x of the cap part 20 is a recess formed to have a shape inverse to the shape of the protrusion part 21 formed on the upper surface 20b of the cap part 20. However, the recess part 21x in the present invention may be formed irrespective of the presence or absence of the protrusion part 21.

Figure 8:
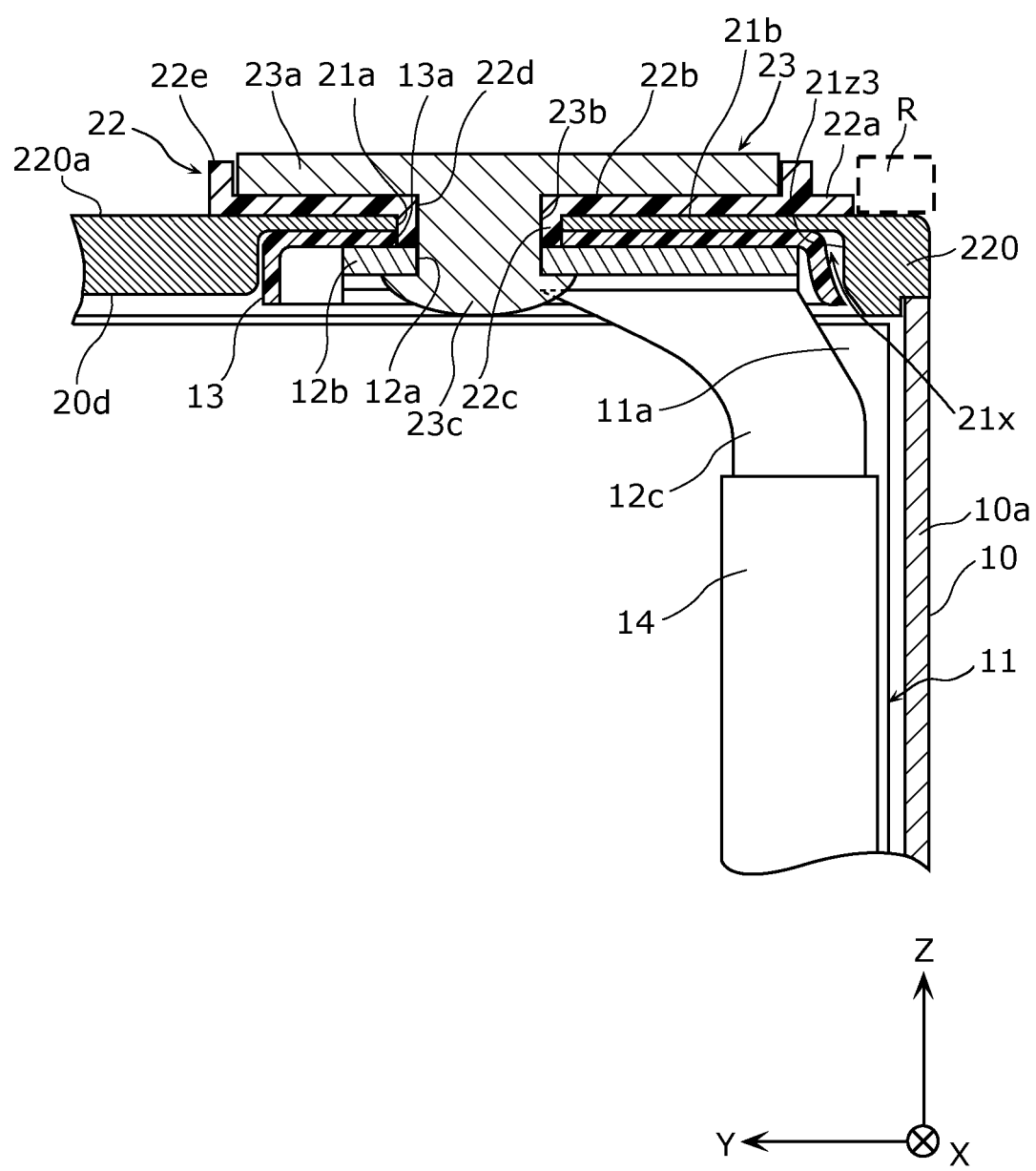
FIG. 8 is a cross-sectional view of main parts around one of the electrode terminals of a non-aqueous electrolyte secondary battery having another structure according to the present invention.

For example, as shown in FIG. 8, it is possible to employ a cap part 220 which has a flat upper surface 220a without any protrusion part and has a rear portion in which a recess part 21x is formed through a processing of pressing, cutting, or the like. With this structure, it is also possible to increase the housing efficiency of the electrode assembly 11 with respect to the capacity of the container 30, as in the case of the structure shown in FIG. 2. In addition, since the part other than the recess part 21x of the cap part 220 has a larger thickness, it is possible to increase the rigidity of the cap part 220 and to increase the strength of the non-aqueous electrolyte secondary battery 1.

However, it is preferable to form the protrusion part 21 when forming the recess part 21x because the following advantageous effects can be obtained. Disposing the electrode terminal 23 on the upper surface of the protrusion part 21 used as the protrusion part according to the present invention facilitates positioning of the electrode terminal 23, which makes it possible to increase the productivity.

In addition, in the non-aqueous electrolyte secondary battery 1 in this embodiment, the internal insulation sealing member 13, the base part 12b of the current collector 12, and the riveted end 23c are housed in the recess part 21x of the cap part 20. In FIG. 2, the position of the point which is the lowermost end portion of the riveted end part 23c is approximately the same as the position of the frame part 20c of the cap part 20. However, the non-aqueous electrolyte secondary battery 1 is not limited to a battery having the structure shown in FIG. 2 and may be configured to include a riveted end 23c having a reduced height instead or include a joint part which is formed through a process of welding or the like as a member for connecting the electrode terminal 23 and the current collector 12. In this case, the base part 12b of the current collector 12, the internal insulation sealing member 13, and the riveted end 23c as a pressure-bonded end part are housed in the space between a bottom surface 21y of the recess part 21x and a lower surface 20d which is of the cap part 20 and has the recess part 21x formed thereon. When the joint part is formed without forming the riveted end 23c, the base part 12b of the current collector 12 and the internal insulation sealing member 13 are housed in the space between the bottom surface 21y of the recess part 21x and the lower surface 20d which is of the cap part 20 and has the recess part 21x formed thereon. In other words, it is possible to partly house, in the inner space of the recess part 21x, the structural elements that are the base part 12b of the current collector 12, the internal insulation sealing member 13, and the riveted end 23c or the joint part, other than the electrode assembly 11 and the arm parts 12c of the current collector 12 connected to the electrode assembly 11. For this reason, it is possible to approximate the inner shape of the container 30 and the outer shape of the electrode assembly 11. In other words, it is possible to make the electrode assembly 11 closer to the cap part 20 of the container 30 as much as possible when the electrode assembly 11 is housed in the container 30. For this reason, it is possible to increase the housing efficiency of the electrode assembly 11 with respect to the capacity of the container 30 even in the case where the non-aqueous electrolyte secondary battery 1 is configured to include the internal insulation sealing member 13 inside the container 30.

In addition, the electrode assembly in the present invention is a winding-type electrode assembly in the above description, but may be a stacking-type electrode assembly.

In addition, the energy storage element is the non-aqueous electrolyte secondary battery 1 represented by the lithium ion secondary battery in the above description, but may be any other secondary battery such as a nickel hydrogen battery which can charge and release electric energy as electrochemical reactions. Alternatively, the energy storage element may be a primary battery. Furthermore, the energy storage element may be an element for directly storing electricity as charge, such as an electric double-layer capacitor. In short, the energy storage element in the present invention may be any element for storing electricity, and thus the present invention is not limited to the energy storage elements of specific types.

In addition, in the above description, the battery container including the container body 10 and the cap part 20 corresponds to an element container in the present invention, and the electric terminals are provided on the cap part 20. However, the present invention may be implemented as an energy storage element having electric terminals at the side of a container body. In short, the present invention can be implemented as an electricity storage element arbitrarily configured, as long as the electricity storage element includes a base part of the current collector disposed inside a recess part formed at an arbitrary position inside the element container. Accordingly, the present invention is not limited to the states of the connection between the cap part and container body of the element container, and the kinds, shapes, number of the members of the element container.

In addition, the battery body is made of aluminum, but may contain an aluminum alloy, any other metal such as stainless, or a metal compound. In addition, the battery has a hexahedral shape in appearance, but may have a cylindrical shape instead. In short, the element container according to the present invention is not limited to element containers having specific configurations in terms of shapes, materials, and so on.

To sum up, the present invention may be implemented by adding various kinds of modifications to the above embodiment, in addition to the aforementioned variations, within the scope of the present invention.

INDUSTRIAL APPLICABILITY

The present invention as described above provides an advantageous effect of being able to increase the housing efficiency of an electrode assembly with respect to the capacity of a container, and is applicable to energy storage elements such as secondary batteries.

The invention claimed is:

1. An energy storage element comprising:
a container;
an electrode assembly housed in the container;
an electrode terminal provided at the container; and
a current collector which electrically connects the electrode terminal and the electrode assembly,
wherein the container includes a wall having an outer surface and an inner surface, the outer surface having a protrusion part formed to protrude outward from the outer surface, and the inner surface having a recess part formed at a position corresponding to a position of the protrusion part, and
the current collector includes:
a base part comprising a metal plate part which is formed in the recess part and connected to the electrode terminal in the recess part; and
an arm part which extends from the base part in a direction opposite to a protrusion direction of the protrusion part, and is connected to the electrode assembly.

2. The energy storage element according to claim 1,
wherein the recess part has a bottom surface, and a side surface continuously formed between the bottom surface and the inner surface of the wall of the container,
the base part includes:
the plate part formed along the bottom surface; and
paired first wall parts formed continuously from opposing sides of the plate part such that the paired first wall parts faces the side surface of the recess part,
the paired first wall parts are tilted so as to be farther apart from each other at positions more distant from the plate part, and
the arm part is continuous from at least portions of the paired first wall parts and extends from the base part in a direction opposite to the protrusion direction of the protrusion part.

3. The energy storage element according to claim 2,
wherein the recess part has the side surface with paired side surface portions facing the paired first wall parts of the base part, the paired side surface portions being tilted so as to be farther apart from each other at positions more distant from the bottom surface of the recess part.

4. The energy storage element according to claim 2,
wherein the container has an outer shape of an approximately rectangular cuboid, and has a first surface which is rectangular and a second surface orthogonal to the first surface at an end portion in a longitudinal direction of the first surface, and
the protrusion part is formed at a position on the first surface apart from the second surface.

5. The energy storage element according to claim 4,
wherein the arm part includes an arm body connected to the electrode assembly and a bridge part connecting the arm body and the first wall part, and
the bridge part is bent or curved along an inner shape of the recess part.

6. The energy storage element according to claim 5,
wherein, in the longitudinal direction of the container, the arm part of the current collector is connected to the electrode assembly at a position closer to the second surface of the container than to a position of the protrusion part inside the container, and
the bridge part connects the arm body and the paired first wall parts of the base part by being curved from the recess part toward the second surface of the container.

7. The energy storage element according to claim 4,
wherein, in the longitudinal direction of the container, an edge which is of the arm part and at the side of the second surface of the container is positioned closer to the second surface than an edge which is of the base part and at the side of the second surface.

8. The energy storage element according to claim 2,
wherein the current collector has a plurality of the arm part, the plurality of the arm part being paired arm parts respectively continuous from the paired first wall parts, and the paired arm parts sandwich the electrode assembly.

9. The energy storage element according to claim 2, further comprising:
an insulation member disposed between the bottom surface and the base part of the current collector,
wherein the insulation member and the base part are housed in a space which is defined by (i) the inner surface of the wall and (ii) the bottom surface of the recess part.

10. The energy storage element according to claim 9,
wherein the insulation member faces the side surface of the recess part and includes second wall parts enclosing the paired first wall parts of the base part.

11. The energy storage element according to claim 9,
wherein the recess part includes a through-hole through which the electrode terminal penetrates,
the electrode terminal includes:
 a terminal body disposed at a position corresponding to the recess part and outside the container,
 a connection part which penetrates through the through-hole of the recess part, and
 a pressure-bonding end part which is electrically connected to the current collector by sandwiching and pressure-bonding, in the recess part, the container and the current collector together with the terminal body,
wherein the base part, the pressure-bonding end part, and the insulation member are housed in the space which is defined by (i) the inner surface of the wall and (ii) the bottom surface of the recess part.

12. The energy storage element according to claim 1,
wherein the current collector has a plurality of the arm part, the plurality of the arm part being paired arm parts respectively continuous from the paired first wall parts with spacing larger than a width of the base part in a direction in which the paired arm parts are arranged.

13. The energy storage element according to claim 8,
wherein the paired arm parts of the current collector are formed with spacing larger than a width of the base part in a direction in which the paired arm parts are arranged.

14. The energy storage element according to claim 1,
wherein the wall of the container comprises a cap part, and the protrusion part is formed in the cap part of the container.

15. The energy storage element according to claim 1,
wherein the recess part comprises a bottom surface and a side surface which is formed at a first angle with the bottom surface, and wherein the base part of the current collector further comprises a wall part that is formed at a second angle with the plate part, the second angle being substantially the same as the first angle.

16. The energy storage element according to claim 1,
wherein the container comprises a container body and a cap part which covers an opening in the container body, and the cap part comprises the wall of the container, such that the protrusion part is formed in the cap part, and
wherein the cap part comprises a frame part having an outer shape matching an inner edge shape of the opening in the container body so that the frame part fits into the opening.

17. The energy storage element according to claim 16,
wherein the cap part comprises a cap body which is substantially parallel to the bottom surface of the recess part, the frame part projecting from an outer peripheral portion of the cap body in the direction opposite to the protrusion direction of the protruding part, and
wherein the protrusion part protrudes from the cap body inside of the outer peripheral portion of the cap body.

18. The energy storage element according to claim 1, further comprising:
an internal insulation sealing member formed between the base part of the current collector and the bottom surface of the recess part; and
an external insulation sealing member formed between the protrusion part and the electrode terminal,
wherein the protrusion part includes a first through-hole and the base part of the current collector includes a second through-hole which is aligned with the first through-hole, and a diameter of the second-through hole is less than a diameter of the first through-hole such that a cylinder part of the external insulation sealing member is formed in the first through-hole and contacts a surface of the base part of the current collector.

19. An energy storage element comprising:
a container comprising:
 a body; and
 a cap which covers an opening in the body, and includes a protrusion protruding from an outer surface of the cap;
an electrode assembly housed in the container;
an electrode terminal formed in the cap; and
a current collector which electrically connects the electrode terminal and the electrode assembly, and comprises:
 a base part comprising a metal plate part formed in the protrusion and connected to the electrode terminal; and
 an arm part which extends from the base part in a direction opposite to a protrusion direction of the protrusion, and is connected to the electrode assembly.

* * * * *